May 3, 1955　　　J. W. GRENIER　　　2,707,658
ENDLESS TRACK
Filed Nov. 16, 1953

INVENTOR
Joseph Wilfrid GRENIER
BY Robic Bastien
ATTORNEYS

2,707,658
ENDLESS TRACK

Joseph Wilfrid Grenier, Giffard, Quebec, Canada

Application November 16, 1953, Serial No. 392,430

4 Claims. (Cl. 305—10)

The present invention relates to flexible endless track for track-laying vehicles.

More particularly the invention pertains to a form of flexible endless track for use on track laying vehicles such as tractors, snowmobiles and other vehicles which operate in snow, mud or soft ground where a track of maximum flotation is required and is equally well adapted to operate efficiently over solid, uneven terrain.

An important object of the present invention is the provision of an endless track of the character described having a high degree of flexibility longitudinally of the track while having at the same time a high degree of stability in a direction transverse to said track whereby, when the vehicle travels over a snow slope, the tracks will make a step in the snow and thus prevent sideways slipping of the vehicle.

Yet another important object of the present invention is the provision of an endless track arrangement in which the tracks may be manufactured wider than the conventional tracks to afford a greater bearing surface for the vehicle travelling on soft snow.

Still another important object of the present invention is the provision of an endless track of the character described which will not jump the teeth of the driving sprocket wheels.

Another important object of the present invention is the provision of an endless track in which the cross-members are prevented from pivoting on the belts.

Still another important object of the present invention is the provision of a track of the character described in which the elements or members most subject to wear may be easily replaced without having to dismount the whole track.

The foregoing and other important objects of the present invention will become more apparent during the following disclosure and by referring to the drawings in which.

Figure 1:
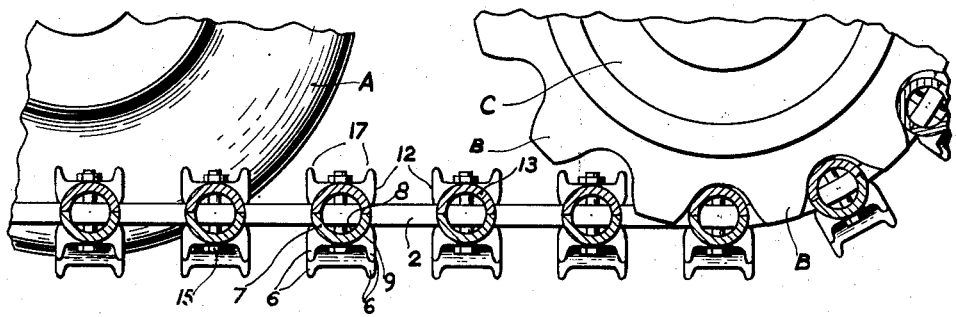
Figure 1 shows the track, according to the invention, in longitudinal section and in meshing engagement with a driving sprocket wheel and with a guiding wheel.
Figure 2:
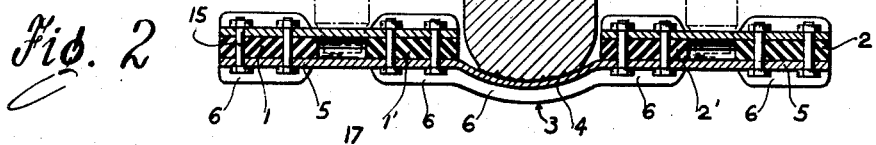
Figure 2 is a transverse cross-section of the track and of a guiding wheel.
Figure 3:
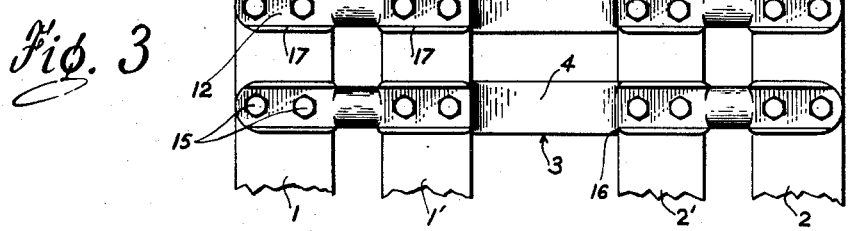
Figure 3 is a partial plan view of the track.
Figure 4:
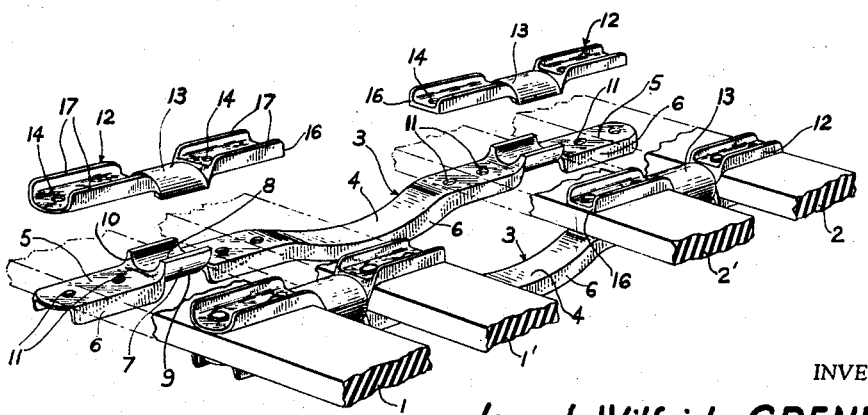
Figure 4 is an exploded partial perspective view of the track.

Referring now more particularly to the drawings in which like reference characters indicate like elements throughout, the endless track, according to the invention, comprises two pairs of flexible belts 1 and 1', 2 and 2', preferably made of rubber, which may be reinforced, if desired, by longitudinally extending embedded steel cables.

The belts 1 and 1', 2 and 2' are spaced from and parallel to one another and the distance separating the belts 1 and 1' of one pair is equal to the distance separating the belts 2 and 2' of the other pair.

But said distances are much smaller than the distance separating the inner belts 1' and 2' of the two pairs of belts. The belts 1, 1' and 2, 2' are maintained in their predetermined spaced relationship by means of cross members equally spaced along the belts and secured thereto. The cross members are made of metal and each consist in a cross bar 3 secured to the outer tread face of the belts, and in a clamping member 12 secured to said cross bar on the inner face of said belts. Each cross bar 3 is formed by a central longitudinally outwardly curved portion 4 extended by two aligned straight end portions 5. The portions 4 and 5 are provided with outwardly extending side flanges 6 adapted to provide traction ground engaging members. In the middle of each end portion 5, there is provided a sprocket engaging portion 7 having a semi-circular inner face 8 and a semi-circular outer face 9 facing outwardly in the direction of the projecting flanges 6. The sides of the portion 7 project inwardly from the end portion 5 a distance approximately equal to half the thickness of the belts thereby forming shoulders 10 for abutting the adjacent sides of a pair of belts, whereby said semi-circular portion 7 extends in the space separating the belts in each pair of belts. The belts 1 and 1', 2 and 2' are rigidly secured to the cross bars 3 by means of the clamping members 12 having substantially the same shape and length as the end portions 5 of the cross bars 3. The clamping members 12 have upstanding side flanges 17 and a semi-circular portion 13 adapted to complete a cylindrical member with the semi-circular portion 7 of the cross bars 3. The clamping members 12 are secured to the belts and to the cross bars 3 by means of bolts 15 passing through the bolt holes 14 of members 12 and the bolt holes 11 of the cross bars 3. When in secured position, the inner ends 16 of the clamping members 12 are aligned with the inner sides of the inner belts 1' and 2' and with the beginning of the curved central portion 4 of the cross bar 3.

According to the invention, the central curved portions 4 of the cross bars 3 are adapted to be engaged by the guide wheels A of the vehicle while the semi-circular portions 13 and 7 extending in the space between each pair of belts 1 and 1', 2 and 2' are adapted to be engaged by the teeth B of the sprocket wheels C disposed preferably at the back and front of the vehicle. It will be noted that the sprocket wheels C will not lie in the same longitudinal plane as the plane containing the guiding wheels A but will be disposed on both sides of said plane. Therefore, the longitudinal stresses imparted to the endless tracks will be equal on both sides of the guiding wheels A due to the equal pulling force exerted by the pair of driving sprocket wheels C whereby the endless tracks will not be deformed in a longitudinal direction, that is, there will not be any torsional stresses produced between the cross members and the belts.

Due to the fact that the sprocket wheels C maintain the endless tracks in a plane substantially perpendicular to the planes of said sprocket wheels and of said guiding wheels A, by applying steadying forces at both ends of the endless tracks, said tracks will not rock sideways about the guiding wheels at any point of their ground engaging portion. Due to this feature, the vehicle equipped with the endless track arrangement according to the invention will be able to travel over sloping ground covered with snow without sideways slipping because the tracks, instead of conforming to the sloping ground, will make a cut or step in the snow.

In order to still increase the stability of the endless tracks, additional sprocket wheels C may be provided intermediate the forward and backward ends of the vehicle, preferably in transverse alignment with the guiding wheels A.

The center of the sprocket wheels C is made of a metal but the gear teeth B are preferably made of molded fiber to diminish the wearing action on the portion 13 of the clamping members 12 which receive the greater part of the thrust exerted on the endless tracks.

It will be noted that the clamping members 12 may be easily replaced when worn out by simply unscrewing the bolts 15.

Normally, the cross bars 3 will not wear as quickly as the clamping members 12 but they themselves can be easily replaced without dismounting the whole endless track from the vehicle wheels.

Due to the fact that the sprocket teeth engaging portions 7 and 13 of the cross members lie in the same plane as that of the belts, the longitudinal spacing between successive sprocket teeth engaging portions will remain constant even when the endless belts turn around the sprocket wheels C, whereby said cross members will not tend to jump the teeth B, but will engage between said teeth. This would not be the case if the sprocket wheels C had engaged the outwardly curved central portions 4 of the cross bars 3 because said central portions lie on a circle of greater diameter than the belts when the endless track turns around a sprocket wheel C.

This particular arrangement, according to the invention, also permits the diameter of the sprocket wheels C to be made slightly smaller than the diameter of the guiding wheels A, whereby the teeth B of said sprocket wheels will not engage the ground and will therefore not be liable to damage.

It will be noted that the flanges 17 of the clamping members 12 form guiding means for the guiding wheels A and sprocket wheels C.

The endless tracks, according to the invention, are particularly adapted for light weight snowmobiles adapted to travel over snow covered ground at relatively fast speeds. But it is understood that the endless tracks may, with proper modifications, be adapted to a heavier type of track vehicles.

While a preferred embodiment according to the present invention has been illustrated and described, it is understood that various modifications may be resorted to without departing from the spirit and scope of the appended claims.

I claim:

1. A cross member for an endless track comprising a bar of U-shaped cross section outwardly, longitudinally curved in its middle portion and defining near both ends thereof semi-cylindrical portions forming shoulders projecting inwardly of said bar, and clamping members of U-shaped cross-section adapted to be secured to the ends of said bar on both sides of said curved middle portion, said clamping members having a middle semi-cylindrical portion adapted to complete a cylindrical member with the semi-cylindrical portion of said bar.

2. A flexible endless track comprising two pairs of flexible belts disposed in laterally spaced parallel relationship, cross members secured to said belts at intervals therealong, each of said cross members consisting of a cross bar secured to the tread face of said belts, and of two clamping members each secured to the inner face of one pair of said belts and to an end portion of said cross bar, said cross bar defining a central outwardly curved portion extending between the inner belts of said pairs of belts, and defining near both ends thereof semi-cylindrical portions forming shoulders projecting inwardly of said bar between the belts of each pair of belts, each of said clamping members having a middle semi-cylindrical portion forming shoulders projecting outwardly between the two belts of each pair of belts and adapted to complete a cylindrical member with the opposite semi-cylindrical portion of said bar.

3. An endless track comprising two pairs of flexible belts disposed in laterally spaced parallel relationship, cross members secured to said belt at intervals therealong, each of said cross members consisting of a bar of U-shaped cross section outwardly and longitudinally curved in its middle portion and defining near both ends thereof semi-cylindrical portions forming shoulders projecting inwardly of said bar, and clamping members of U-shaped cross section adapted to be secured to the ends of said bar on both sides of said curved middle portion, said clamping members having a middle semi-cylindrical portion adapted to complete a cylindrical member with the semi-cylindrical portion of said bar, each of said cylindrical members extending between the two belts of each pair of belts.

4. An endless track comprising two pairs of flexible belts disposed in laterally spaced relationship, cross members secured to said belts at intervals therealong, each of said cross members consisting of a cross bar of U-shaped cross section outwardly and longitudinally curved in its middle portion and defining near both ends thereof semi-cylindrical portions forming shoulders projecting inwardly of said bar between the two belts of each pair of belts, and clamping members of U-shaped cross-section adapted to be secured to the ends of said bar over each pair of belts on both sides of said curved middle portion, each of said clamping members having a middle semi-cylindrical portion forming shoulders projecting outwardly between the two belts of each pair of belts and adapted to complete a cylindrical member with the opposite semi-cylindrical portion of said bar, said cylindrical member extending substantially in the plane of said belts.

References Cited in the file of this patent

UNITED STATES PATENTS

| | | |
|---|---|---|
| 2,061,229 | Fergusson | Nov. 17, 1936 |
| 2,494,066 | Slemmons | Jan. 10, 1950 |
| 2,515,128 | Lammertse | July 11, 1950 |